Nov. 6, 1923. Re. 15,719
W. A. WHITNEY
PUNCH
Original Filed Aug. 18, 1919 2 Sheets-Sheet 1
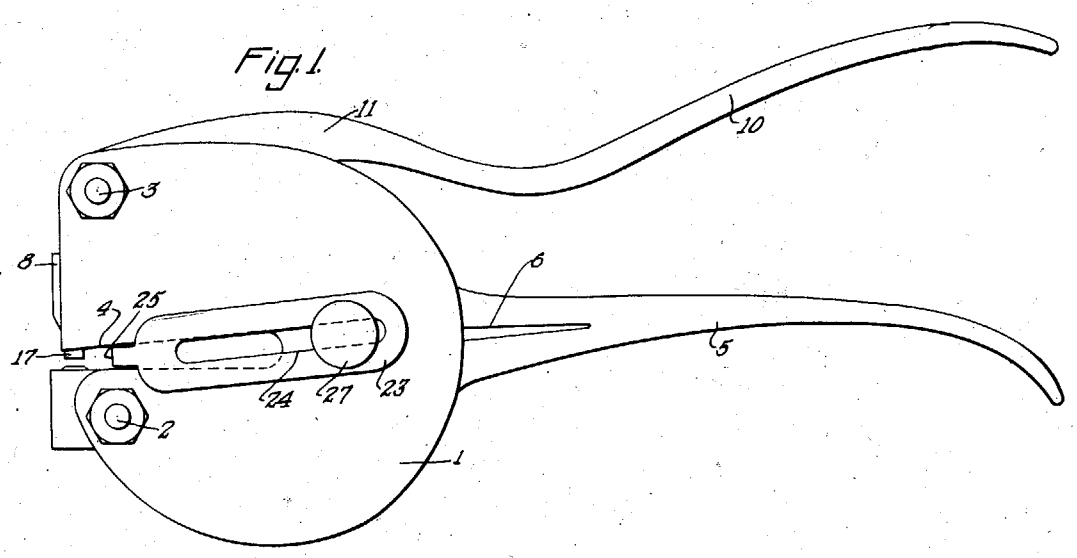
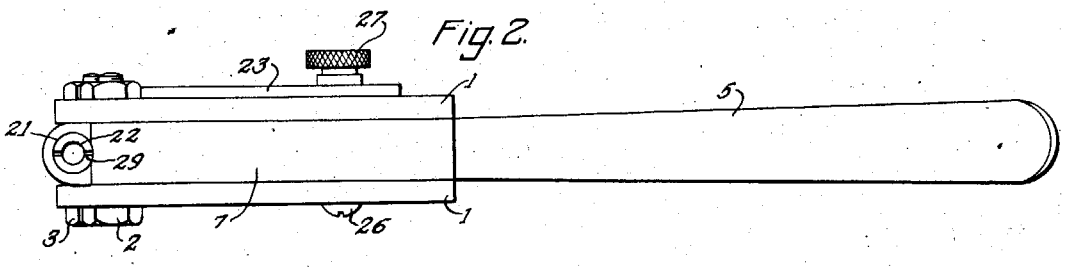
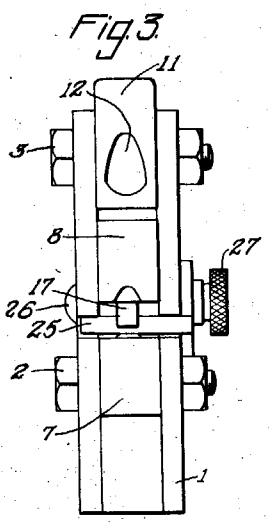
WITNESS
Loie Condé
INVENTOR
W. A. Whitney
BY Wilson & McCayna.
ATTYS.

Nov. 6, 1923. Re. 15,719
W. A. WHITNEY.
PUNCH
Original Filed Aug. 18, 1919 2 Sheets-Sheet 2
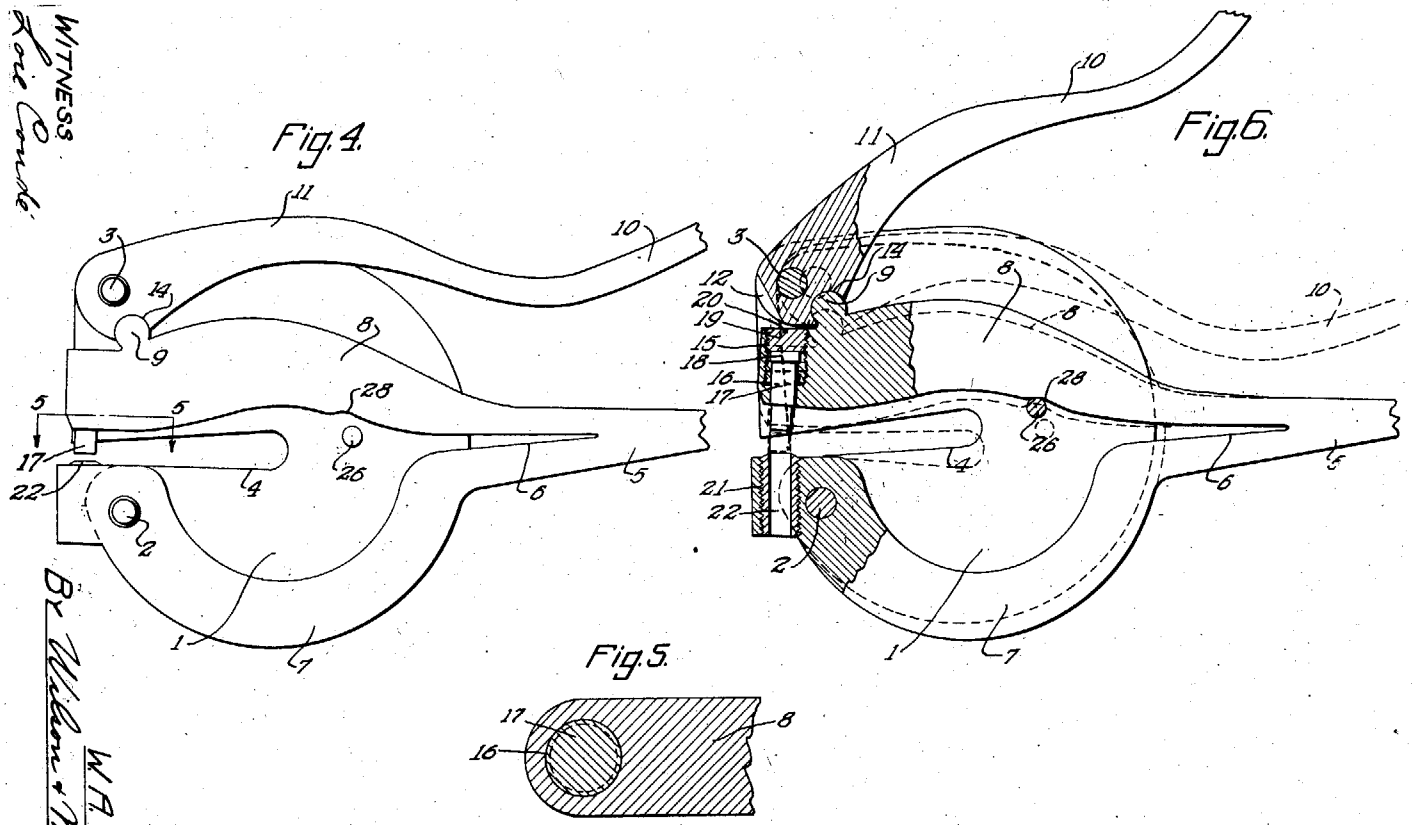
WITNESS
Loie Conde
INVENTOR
W. A. Whitney
By Wilson & McCanna
ATTYS.

Reissued Nov. 6, 1923. Re. 15,719

UNITED STATES PATENT OFFICE.

WILLIAM A. WHITNEY, OF ROCKFORD, ILLINOIS, ASSIGNOR TO FRANK VANDER BOGART AND HIRAM A. MERLIEN, BOTH OF ROCKFORD, ILLINOIS.

PUNCH.

Original No. 1,376,492, dated May 3, 1921, Serial No. 318,262, filed August 18, 1919. Application for reissue filed April 12, 1923. Serial No. 631,721.

*To all whom it may concern:*

Be it known that I, WILLIAM A. WHITNEY, a citizen of the United States, residing at Rockford, in the county of Winnebago and State of Illinois, have invented a new and useful Punch, of which the following is a specification.

The device forming the subject matter of this application is a punch adapted to be used by tinners and others, and the invention aims to provide novel means for actuating and mounting the punch element proper, through the instrumentality of co-operating handles, one of which is provided with a resilient tongue carrying the punch.

Another object of the invention is to equip a device of the kind above mentioned with a gage of novel form.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a punch constructed in accordance with the invention, with the punch partly closed;

Fig. 2 is an elevation of the device, the same being viewed at right angles to the showing of Fig. 1;

Fig. 3 is an end elevation;

Fig. 4 is an elevation wherein one of the side plates has been removed;

Fig. 5 is a fragmental section taken approximately on the line 5—5 of Fig. 4; and Fig. 6 is a section wherein the cutting plane has been passed parallel to the side plate, parts being broken away and sectioned. This view shows the punch opened in full lines and closed in dotted lines.

In carrying out the invention there is provided a frame comprising plates 1 of approximately circular form held together by securing devices 2 and 3, which may be bolts, the securing device being located adjacent to the outer ends of the plates or side members 1. Each plate 1 is applied at its outer end with a slot 4.

In addition to a first handle 10, hereinafter described, the device includes a second handle 5, bifurcated as indicated at 6, to form a head 7 and a resilient jaw 8, the head and the jaw extending between the plates 1, the outer edge of the head 7 being curved to conform approximately to the outline of the plates 1. On its outer edge, and adjacent to its free end, the jaw 8 is supplied with a projection 9 which is circular in cross section.

The first handle 10 includes a head 11 extended between the plates 1, the head 11 having a notch 12 in its outer end, and being provided in its edge with a circular recess 14 which receives for rocking movement, the projection 9 on the jaw 8 of the handle 5. The jaw 8 is provided near to its free end with a threaded passage 15 communicating with a reduced bore 16. A head 11 is mounted to swing on the securing device 3, the head 7 being mounted to swing on the securing device 2, the handles 5 and 10 having swinging movement in a plane parallel to the plates 1.

The numeral 17 denotes a punch provided at its inner end with a head 18 co-operating with the shoulder formed at the inner end of the threaded passage 15, the punch extending through the bore 16. A plug 19 is threaded into the passage 15 and co-operates with the head 18 of the punch to hold the punch in place. At this point it may be noted that the notch 12 in the end of the head 11 facilitates the mounting of the plug 19 and the punch 17 in the end of the jaw 8. The plug 19 is provided with a kerf 20 whereby the plug may be rotated through the instrumentality of a screw driver. The end of the head 7 of the handle 5 is provided with a recess 21 into which a tubular anvil 22 is threaded. The anvil 22 is supplied in its outer end with a screw driver kerf 29 facilitating the insertion and the mounting of the anvil in the part 7. The projecting end of the punch 17 is adapted to be received in the adjacent end of the anvil.

The invention comprises a gage including a body in the form of a plate 23 co-operating with one of the plates 1 and located on the outside of the said plate. The body 23 of the gage is provided with a longitudinal slot 24, the body of the gage having a rectangularly disposed end 25 extended transversely of the frame of the punch, and passing through the slots 4 in the plates 1. A screw 26 or the like connects the plates 1 and is received in the slot 24 of the body 23 of the gage, a thumb nut 27 being threaded upon the screw 26 and coacting with the body portion 23 of the gage. Said screw also serves as a stop adapted to co-operate with the cutaway 28 on the inner edge of the jaw 8 for limiting the opened position of the punch as will be later described.

In practical operation, the body 23 of the gage may be slid backwardly and forwardly on the screw 26, owing to the fact that the screw is received in the slot 24. The thumb nut 27 may be tightened up to hold the gage in adjusted positions and to vary the distance between the angularly disposed end 25 of the gage and the punch 17. In this way the distance between the hole formed by the punch 17 in the material, and the edge of the material, may be regulated.

When the handles 5 and 10 are pressed together, the handles fulcrum, respectively, on the elements 2 and 3. Since the projection 9 on the jaw 8 of the handle 5 is received in the recess 14 of the head 11 of the handle 10 for rocking movement, it will be obvious that, when the handles 5 and 10 are pressed together the jaw 8 will be advanced toward the head 7, the punch 17 being advanced, accordingly, to co-operate with the anvil 22. When the handles 5 and 10 are released, the resilient jaw 8 will react, and move the punch 17 away from the anvil 22, into the position shown clearly in full lines in Fig. 6 of the drawings.

Referring more particularly to the operation, it will be noted that in Figs. 1 and 4, the punch is shown in a partly closed position. The normal or open position is shown in full lines in Fig. 6. The tendency of the resilient jaw 8 to open, that is, to withdraw the punch 17, is limited by the screw 26 striking against the under edge 28 of said jaw, as shown in Fig. 6, and as will be presently apparent. Referring again to the operation of pressing together the handles 5 and 6, this being the punching operation, it will be observed viewing Fig. 6, that inasmuch as the second or lower handle is generally held stationary or rested upon a work bench or other stationary object, its fulcrum element 2 will likewise remain stationary and the first or upper handle will be swung downwardly in a clockwise direction about its fulcrum on the element 3. During this downwardly swinging movement of the first handle, its fulcrum element 3 will move to the right in an arc about the element 2 as a center. This latter movement is due to the fact that the distance between the centers of the elements 2 and 3 is constant because of their connection to the side plates, as likewise is the distance between the centers of the element 3 and the projection 9, and between the latter and the fixed or inner end of the jaw 8, and that the projection 9 in being swung downwardly to carry the punch toward the anvil by the action of said downwardly swinging movement of the first handle, moves in an arc about the inner end of the jaw 8 as a center, thereby drawing the element 3 to the right. This movement of the element 3 is permitted by reason of the fact that it is carried by the side plates and the latter are free to swing on the element 2. Thus when closing and opening the punch, the element 3 becomes a swinging fulcrum and the side plates carry said fulcrum back and forth to permit of the desired lever action. It will be noted that the side plates swing downwardly about the element 2 when closing the punch and upwardly when opening; and that the punch is closed by hand pressure and opened by release of said pressure, allowing the resilient jaw to withdraw the punch from the anvil. It follows, therefore, that this opening movement under the influence of the spring pressure stored in the resilient jaw, will be stopped by contact of the screw 26 carried by the upwardly moving side plates against the edge 28 of the jaw, thus stopping the first handle in the open position above referred to.

It will be observed from the foregoing, that by reason of the organization of parts, a powerful leverage is obtained in which friction is reduced to a minimum and which permits of an easy hand movement. It will be further observed that the punching pressure is carried through the side members or plates 1 of the frame, and that inasmuch as a relatively long slot or mouth is provided in each side member for the reception of the material to be punched, such members are shaped in the manner shown so as to possess an ample factor of safety against deflection or breaking under the bending strain resulting from the pressure in a line between the elements 2 and 3.

Having thus described the invention, what is claimed is:—

1. In a device of the class described, a first handle; a second handle bifurcated to form a head and a resilient jaw located between the head and the first handle; a frame whereunto the first handle and the head are pivoted; a punch carried by the jaw and co-operating with the head; and means for connecting the jaw with the first handle.

2. In a device of the class described, side plates; securing devices connecting the side plates, a first handle mounted to swing on one securing device, a second handle bifurcated to form a head mounted to swing on the other securing device, and to form a resilient jaw located between the head and the first handle, a punch carried by the jaw and co-operating with the head; and means for connecting the jaw with the first handle.

3. A device of the class described comprising side plates having slots; securing devices connecting the plates; a first handle mounted to swing on one securing device; a second handle bifurcated to form a head mounted to swing on the other securing device, and to form a resilient jaw located between the head and the first handle; a punch carried by the jaw and co-operating with the head; means for operatively connecting the jaw with the first handle; a gage mounted to slide on one plate and including a part extended into the slots and located to the rear of the punch; and means for securing the gage releasably to said plate.

4. In a device of the class described, a first handle; a second handle bifurcated to form a head and a resilient jaw located between the head and the first handle; a frame whereunto the first handle and the head are pivoted; a punch carried by the jaw and co-operating with the head; and means for connecting the jaw with the first handle comprising a projection on the jaw circular in cross section and a recess in the first handle which receives said projection for rocking movement.

5. In a device of the class described, a first handle, a second handle bifurcated to form a head and a resilient jaw located between the head and the first handle; a frame whereunto the first handle and the head are pivoted; a punch carried by the jaw and co-operating with the head; and means for connecting the jaw with the first handle, comprising co-acting faces between the head of the first handle and said jaw for moving the latter toward the head on the second handle when said handles are moved together in the punching operation.

6. A device of the class described comprising side plates having slots providing a mouth for the reception of material to be punched, securing devices on opposite sides of said mouth connecting the plates, a first handle mounted to swing on one securing device, a second handle mounted to swing on the other securing device, a jaw interposed between said handles, a punch carried by the jaw and adapted to be moved thereby into punching relation with the second handle, and means operatively connecting said jaw with the first handle for moving the latter in said punching operation.

7. A device of the class described comprising side plates, a pair of securing elements connecting said plates, a first handle between said plates mounted to swing on one securing element and carrying an anvil, a second handle between said plates mounted to swing on the other securing element, a punch-moving part interposed between said plates and handles and movable relatively thereto, a punch associated with said part and adapted to be moved thereby in the punching operation, a projection on said punch-moving part circular in cross-section, and a recess in the handle which receives said projection for transmitting the punching movement.

8. A device of the class described comprising side members, a pair of securing elements connecting said members, an anvil-carrying part mounted between said members on one of said securing elements, a punch-operating part mounted between side members on the other securing element, a punch-carrying part interposed between said anvil-carrying and punch-operating parts with its punch in operative relation to said anvil, a projection on said punch-carrying part circular in cross-section, and a recess in said operating part which receives said projection for moving the punch in punching and retracting movements.

9. A device of the class described comprising side plates having slots providing a mouth for the reception of material to be punched, a pair of securing elements connecting said plates at opposite sides of said mouth, an anvil-carrying part mounted between said plates on one of said securing devices, a handle mounted between said plates on the other securing device, a punch-moving part between said anvil-carrying part and the handle, a projection on said anvil-moving part circular in cross-section, and a circular recess in said handle for the reception of said projection for transmitting the punching movement.

10. A device of the class described comprising a frame shaped to provide a mouth for the reception of the material to be punched, an anvil-carrying part pivotally associated with said frame below its mouth, an operating lever pivotally associated with said frame above its mouth, a punch-moving part interposed between said anvil-carrying part and said operating lever and pivotally associated with the latter so as to be moved by operation thereof in a punching movement, and resilient means urging said punch-moving part and the lever in a punch-withdrawing direction.

11. A device of the class described comprising a frame, an anvil-carrying part pivoted on the frame, an operating handle pivoted on the frame, the distance between said pivotal connections being fixed and one of said connections and the frame being free to swing about the other, a punch-carrying part interposed between said anvil-carrying part and the handle and having on its side adjacent to the latter, a projection circular in cross-section, and said handle having a circular recess for the reception of said projection for transmitting the punching pressure.

12. A device of the class described comprising side plates approximately circular, each having a slot providing a mouth for reception of material to be punched, securing devices holding said plates together and located adjacent to and at opposite sides of said mouth, an anvil-carrying part mounted between said plates on one of said securing devices, a handle having a head mounted between said plates on the other securing device, a punch-moving part between said heads attached to said anvil-carrying part and having a projection circular in cross-section, and said handle head having a circular recess for the reception of said projection for transmitting the punching pressure.

13. A device of the class described comprising a frame shaped to provide a mouth for the reception of material to be punched, an anvil-carrying part pivotally connected to said frame below its mouth, an operating lever pivotally connected to said frame above its mouth, a punch-moving part adapted for advancing and retracting the punch, a pivotal connection between said operating lever and the punch-moving part for advancing the punch by operation of said lever, and means constantly urging said punch-moving part in a direction to retract the punch.

14. A device of the class described comprising side plates each having a slot providing a mouth for the reception of material to be punched, securing elements connecting said plates on opposite sides of said mouth, a first handle between said plates mounted for swinging movement on one of said securing elements, a second handle between said plates mounted for swinging movement on the other securing element, an anvil on the second handle, a punch-carrying part mounted on said second handle with capacity for movement at its punch-carrying end in a punching operation with respect to said anvil, a projection on said punch-carrying part circular in cross-section, and a circular recess on the first handle for the reception of said projection for transmitting the punching pressure.

15. A device of the class described comprising side plates slotted to provide a mouth for the reception of material to be punched, securing elements connecting said plates on opposite sides of said mouth, a first handle having a head between said plates and fulcrumed on one of said securing means, a second handle having a head between said plates and fulcrumed on the other securing element, an anvil on the head of the second handle, a punch, a part interposed between the side plates and said handles and connected at one end to the punch, said part being connected at its opposite end to the second handle with capacity for movement at its punch-connected end toward and from said anvil, a projection on said punch-connected part circular in cross-section, and a circular recess in the head of the first handle for the reception of said projection for transmitting the punching pressure.

16. A device of the class described comprising side plates, an anvil-carrying part and an operating handle each interposed between and pivotally connected to said side plates, the distance between the centers of said pivotal connections being fixed and one of said centers and the side plates being movable in an arc about the other, a punch-carrying part interposed between said side plates and connected to said anvil-carrying part so as to swing at its punch-carrying end toward and from the anvil, said punch-carrying part being pivotally connected to said operating handle, the center of the last mentioned pivotal connection being laterally offset from a line connecting said pivotal connections of the anvil-carrying part and operating lever when the punch is retracted and adapted to be brought closer to said line by movement of said handle about its pivotal connection with the plates, whereby to transmit punching pressure to the punch-carrying part, said movement toward said line being permitted by the aforementioned movement of the side plates about one of said centers.

17. A device of the class described comprising a first handle and a second handle, side plates between and upon which said handles are respectively fulcrumed, and anvil on the second handle, a punch, a punch-carrying member intermediate said handles, means connecting the first handle with the punch-carrying member for transmitting punching pressure, and resilient means for moving said punch-carrying member in a direction to withdraw the punch.

18. A device of the class described comprising a first handle and a second handle, side plates between and upon which said handles are respectively fulcrumed, an anvil on the second handle, a punch, a punch-carrying member intermediate said handles, means connecting the first handle with the punch-carrying member for transmitting punching pressure, resilient means for moving said punch-carrying members in a direction to withdraw the punch and move the handles to an open position, and a stop operative between one of the side plates and the second handle for limiting movement to said open position.

19. A device of the class described comprising an anvil, an anvil-carrying part, a pair of side plates at the sides of and pivotally connected to said anvil-carrying part, an operating handle lever pivotally mounted upon and between said side plates above said anvil-carrying part, a punch, a punch-carrying part located between said handle lever and anvil-carrying part and connected to the latter with capacity to move back and forth therebetween for carrying the punch to and from the anvil, said punch-carrying part being yieldingly urged in a direction to withdraw the punch and move the co-operating parts to an open position, and said punch-carrying part adapted to be moved in the opposite direction by operation of said handle lever for transmitting the punching pressure.

20. A device of the class described comprising an anvil, an anvil-carrying part, a pair of side plates at the sides of and pivotally connected to said anvil-carrying part, an operating handle lever pivotally mounted upon and between said side plates above said anvil-carrying part, a punch, a punch-carrying part located between said handle lever and anvil-carrying part and connected to the latter with capacity to move back and forth therebetween for carrying the punch to and from the anvil, said punch-carrying part being yieldingly urged in a direction to withdraw the punch and move the co-operating parts to an open position, said punch-carrying part adapted to be moved in the opposite direction by operation of said handle lever for transmitting the punching pressure, and a stop operative between one of said side plates and the anvil-carrying part for limiting movement of said co-operating parts in the open position.

WILLIAM A. WHITNEY.